United States Patent [19]

Haeck

[11] 4,403,684
[45] Sep. 13, 1983

[54] FLUID SHEAR COUPLING APPARATUS

[75] Inventor: Paul J. Haeck, Indianapolis, Ind.

[73] Assignee: Wallace Murray Corporation, New York, N.Y.

[21] Appl. No.: 219,228

[22] Filed: Dec. 22, 1980

[51] Int. Cl.[3] .................. F16D 33/12; F16D 35/00; F16D 43/25

[52] U.S. Cl. .................. 192/58 B; 192/82 T

[58] Field of Search .................. 192/58 B, 82 T

[56] References Cited

U.S. PATENT DOCUMENTS

| | | | |
|---|---|---|---|
| 3,174,600 | 3/1965 | Oldberg | 192/58 B |
| 3,323,623 | 6/1967 | Roper | 192/58 B |
| 3,458,020 | 7/1969 | Lutz | 192/58 B |
| 3,498,431 | 3/1970 | Sutaruk | 192/57 |
| 3,575,269 | 4/1971 | Sherman | 192/58 B |
| 3,809,197 | 5/1974 | Clancey | 192/58 B |
| 3,856,122 | 12/1974 | Leichliter | 192/58 B |
| 3,964,582 | 6/1976 | Mitchell | 192/58 B |
| 3,978,952 | 9/1976 | Hall | 192/58 B |
| 4,004,668 | 1/1977 | Blair | 192/58 B |
| 4,007,819 | 2/1977 | Maci | 192/58 B |
| 4,116,318 | 9/1978 | Crisenbery et al. | 192/58 B |
| 4,235,322 | 11/1980 | Sutaruk | 192/58 B |
| 4,238,015 | 12/1980 | Schmida | 192/58 B |
| 4,246,995 | 1/1981 | Gee | 192/58 B |
| 4,271,946 | 6/1981 | Bridge | 192/58 B |
| 4,278,158 | 7/1981 | Martin | 192/58 B |
| 4,281,750 | 8/1981 | Clancey | 192/58 B |

FOREIGN PATENT DOCUMENTS 2364234 7/1975 Fed. Rep. of Germany .... 192/58 B
1074451 7/1967 United Kingdom ............. 192/58 B Primary Examiner—Rodney H. Bonck
Attorney, Agent, or Firm—Woodward, Weikart, Emhardt & Naughton

[57] ABSTRACT

A fluid shear coupling apparatus is disclosed herein which includes a driving member received within a working chamber defined by a driven member. The driven member is mounted with needle bearings to a shaft portion of the driving member to have the members rotatable about a common axis. The driving and driven members include complementary shaped and positioned fluid shear and thrust surfaces defining fluid shear and thrust chambers, respectively, therebetween and cooperable with shear fluid within the chamber to transmit torque and axial thrust loads between the members. The fluid shear surfaces are defined by interdigitated ridges and grooves. A shear fluid reservoir is located in the central portion of the driven member and passageways lead from an annular groove and cylindrical cavity adjacent the driving member back to the reservoir. A recycle passageway also leading from the annular groove and connects with the working chamber at a radially-inward location to provide recirculation of shear fluid through the working chamber. Several projections and dams are received within the cylindrical cavity and annular groove to provide shear surfaces for transmitting torque between the driving and driven members, and also to facilitate the pumping of the shear fluid from the working chamber back to the reservoir or through the recycle flow path.

18 Claims, 5 Drawing Figures

FLUID SHEAR COUPLING APPARATUS

BACKGROUND OF THE INVENTION

1. Field of the Invention

The present invention relates to a fluid shear coupling apparatus, and particularly to an apparatus having improved operational and maintenance features.

2. Description of the Prior Art

A variety of fluid shear couplings are known in the art and which typically include a driving member received within a working chamber defined by the driven member. Various, specific fluid shear surfaces and mounting means have been proposed. It is an object of the present invention to provide a fluid shear coupling apparatus which has improved operational and maintenance features over those of the prior art.

In U.S. Pat. No. 3,809,197, issued to Clancey on May 7, 1974, there is disclosed a viscous coupling including relatively rotatable input and output coupling members. These coupling members include a plurality of interdigitated lands and grooves which define a shear space therebetween and which are cooperable with viscous shear fluid in the shear space to transmit torque between the coupling members. A temperature-responsive valve means is included for controlling flow of viscous fluid from a reservoir chamber to the shear space. The output coupling member is mounted to a shaft of the input coupling member by means of ball bearings. A similar viscous coupling is disclosed in U.S. Pat. No. 3,856,122, issued to Leichliter on Dec. 24, 1974. The Leichliter coupling includes interdigitated lands and grooves defining a shear space between input and output coupling members. The Leichliter coupling is specifically designed to improve heat dissipation by means of the particular location of the shear surfaces and by the use of cooling fins rotating at the input speed to generate a greater blower action through the fins. Similar fluid shear couplings are disclosed in U.S. Pat. Nos. 3,498,431, issued to Sutaruk on Mar. 3, 1970; 3,323,623, issued to Roper on June 6, 1967; and 3,174,600, issued to Oldberg on Mar. 23, 1965.

The use of an anti-friction coating on portions of a fluid shear coupling apparatus is also known in the art. In U.S. Pat. No. 3,964,582, issued to Mitchell on June 22, 1976, there is disclosed a fan drive hydraulic coupling which includes a polyphenylene sulfide material coated on the sides of the drive or input disc. The material coating functions as an anti-friction and bearing surface. A different type of coating for use in a fluid shear coupling is disclosed in U.S. Pat. No. 3,978,952, issued to Hall on Sept. 7, 1976.

In U.S. Pat. No. 4,004,668, issued to Blair on Jan. 25, 1977, there is disclosed a fluid shear coupling which includes pumping grooves extending across the concentric ridges or lands defining the fluid shear surfaces. These secant grooves extend across the top of the interdigitated ridges of the driving member and of the housing interior to cause the shear fluid to move generally radially for the purpose of inhibiting high temperature build-ups.

SUMMARY OF THE INVENTION

Briefly described, the present invention includes a fluid shear coupling apparatus having a driving member defining a fluid shear surface and being received within a driven member having a complementary fluid shear surface. A fluid shear chamber is defined by the shear surfaces and functions with shear fluid within the chamber to transmit torque between the driving and driven members. In one aspect of the present invention, the coupling apparatus includes first flow means for providing a flow of shear fluid between a shear fluid reservoir and the working chamber within which the driving member is received, and a second flow means for recirculating shear fluid from a radially-outward location in the working chamber directly to a radially-inward location of the working chamber.

In another aspect of the present invention, flow means is provided for providing a flow of shear fluid from the shear fluid reservoir and/or recirculated shear fluid directly to both sides of the driving member, and also for returning shear fluid from both sides of the driving member to the reservoir and/or the recirculation flow path. In a third aspect of the present invention, the coupling apparatus includes flow means comprising an annular groove and cylindrical cavity located adjacent the outer perimeter of the driving member and having a dam and projection, respectively, received therein for promoting torque transmission between the driving and driven members and for enhancing flow of the shear fluid from the working chamber back to the reservoir or in a recycle flow path.

It is an object of the present invention to provide a fluid shear coupling apparatus which has advantageous and improved coupling and maintenance features.

A further object of the present invention is to provide a fluid shear coupling apparatus which provides good circulation of the shear fluid to improve heat dissipation and also to lengthen the life of the apparatus.

It is another object of the present invention to provide a fluid shear coupling apparatus which has a substantially continuous recirculation of shear fluid into the working chamber.

A further object of the present invention is to provide a fluid shear coupling apparatus which includes means for directing the flow of shear fluid from the reservoir to both sides of the driving member, particularly when shear or thrust surfaces are located on both sides of the driving member.

Another object of the present invention is to provide a fluid shear coupling apparatus which has improved means for pumping the shear fluid from the working chamber back to the reservoir or in a recirculation flow path.

Further objects and advantages of the present invention will become apparent from the description of the preferred embodiment which follows.

DESCRIPTION OF THE PREFERRED EMBODIMENT

Figure 1:
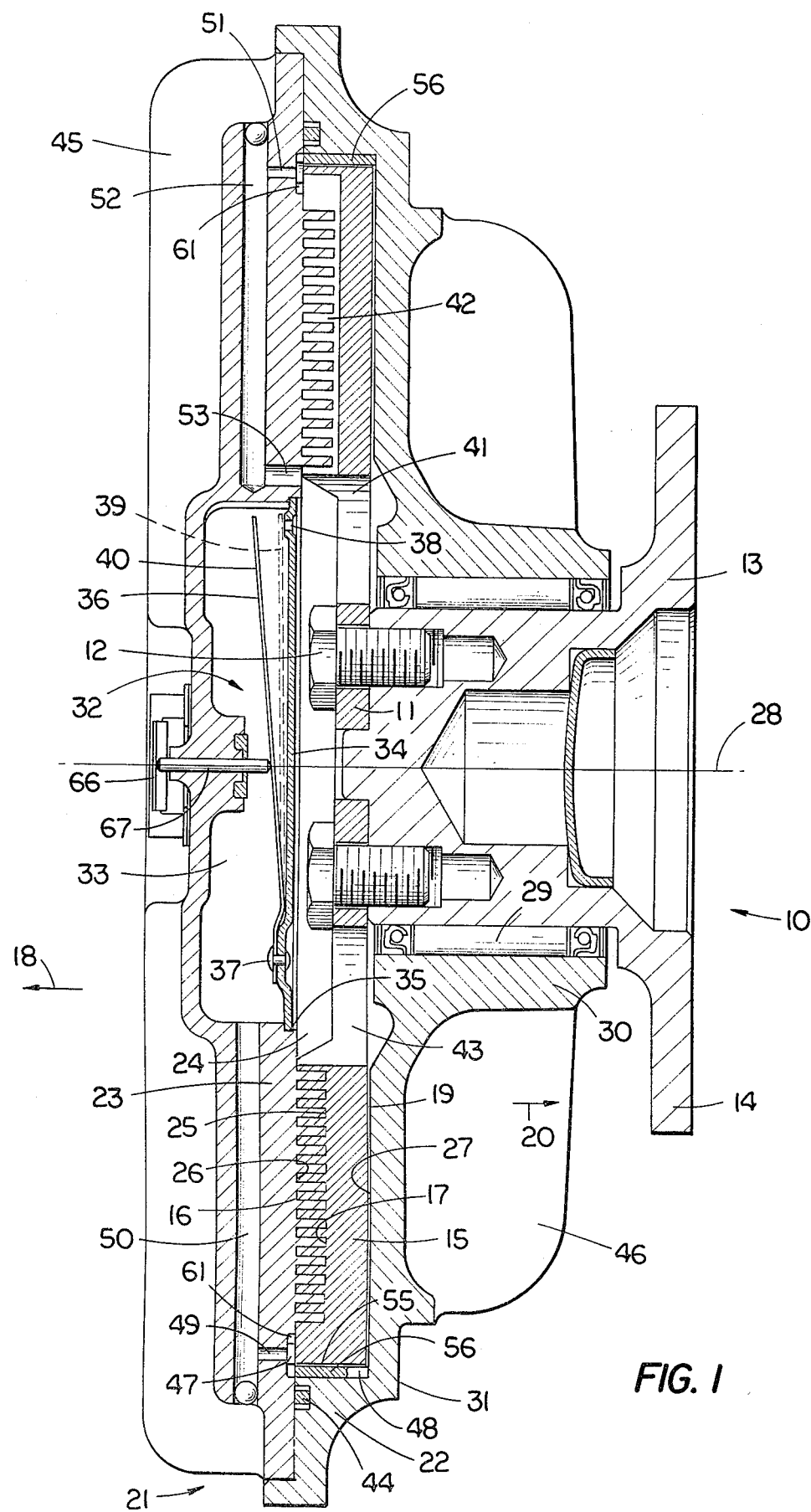
FIG. 1 is a side, cross-sectional view of a fluid shear coupling apparatus constructed in accordance with the present invention.
Figure 2:
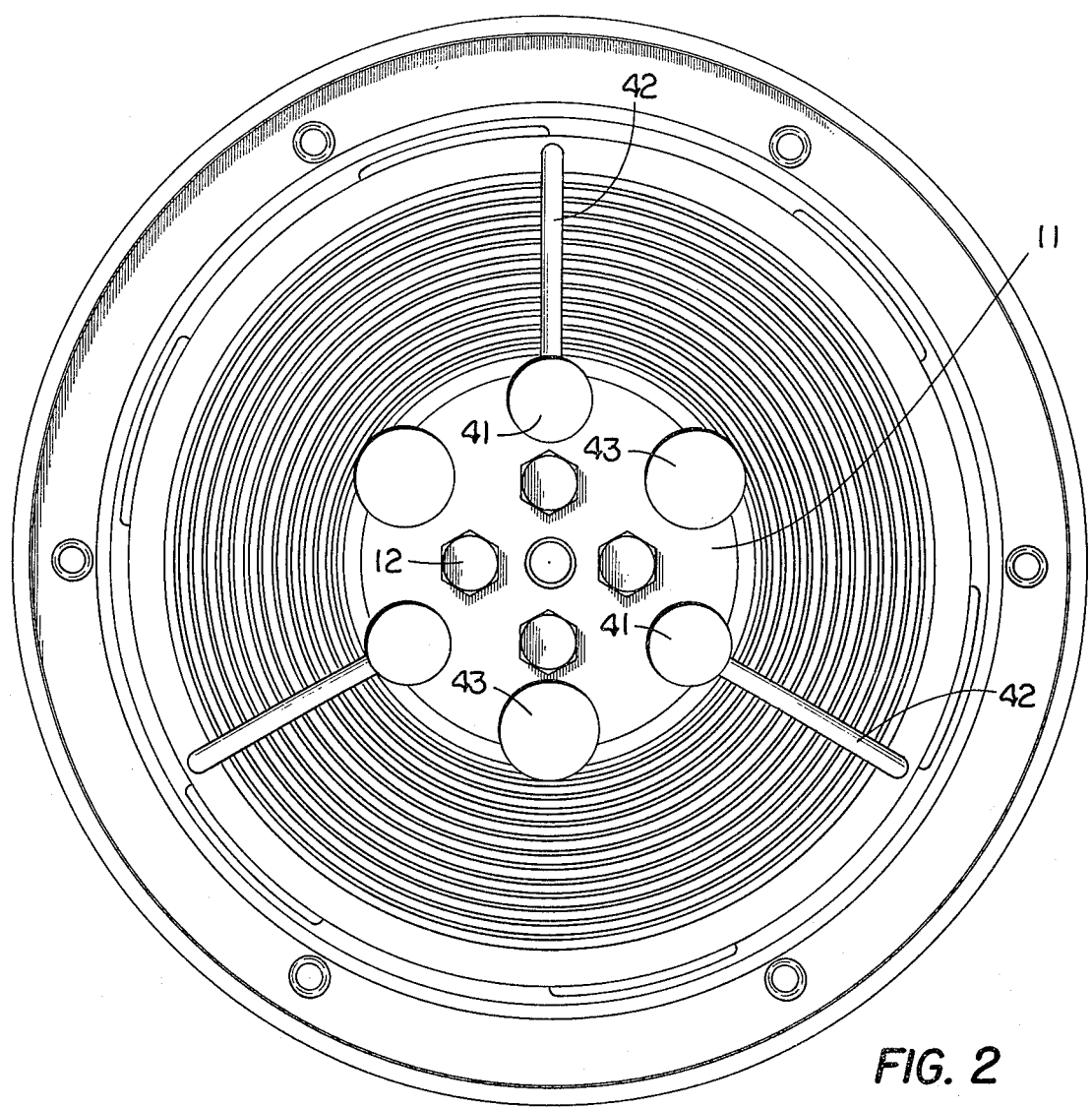
FIG. 2 is a front, elevational view of the apparatus of FIG. 1, and particularly showing the driving member and portions of the bearing housing with the cover removed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a fluid shear coupling apparatus 10 constructed in accordance with the present invention. The apparatus includes a driving member 11 mounted with bolts 12 to a shaft 13. The shaft 13 is connectable to an external drive source in conventional fashion, typically by means of bolts received through apertures (not shown) in the mounting flange portion 14 of the shaft. The driving member 11 includes a disc-shaped portion 15 defining several annular ridges 16 and grooves 17 facing in a first axial direction 18. The disc-shaped portion 15 of the driving member also defines a first thrust surface 19 facing in a second axial direction 20 opposite the first axial direction.

The coupling apparatus further includes a driven member 21 including a bearing housing 22 and a cover 23. The driven member defines a working chamber 24 within which the driving member 11 is received. The cover of the driven member defines several annular ridges 25 and grooves 26 facing in the second axial direction 20 and received adjacent the respective grooves 17 and ridges 16 of the driving member. This close, spaced-apart positioning of the complementary shaped grooves and ridges provides opposed shear surfaces defining a fluid shear chamber therebetween. In conventional fashion, the reception of shear fluid within this fluid shear chamber will provide for the transmission of torque between the driving member and the driven member. The bearing housing 22 also defines a second thrust surface 27 facing in the first axial direction 18 and positioned adjacent and spaced from the first thrust surface 19. This close, spaced-apart positioning of the first and second thrust surfaces provides a thrust chamber therebetween, and also provides for shear action between the thrust surfaces to increase torque-transmission between the driving and driven members. Consequently, the reception of shear fluid within the thrust chamber will facilitate the transmission of axial thrust loads between the driving member and the driven member.

Mounting means are provided for mounting the driven member 21 to the driving member 11 with each member being rotatable about a common axis 28. In the preferred embodiment, the mounting means includes needle bearing 29 received between a sleeve portion 30 of the bearing housing 22 and the shaft 13. The needle bearing 29 does not carry axial loads, and the provision of the thrust chamer will therefore provide for the carrying of axial thrust loads between the driving and driven members. It will be appreciated that in this preferred embodiment of the present invention, the thrust surfaces 19 and 27 are positioned on the side of the driving member 11 which will require the carrying of the axial thrust loads. For example, in a typical application of the present invention, a fan (not shown) is mounted to the fan mounting surface 31 and is oriented to move air in the second axial direction 20. Thus, the force of the fan urges the driven member 21 in the first axial direction 18, and will cause the axial thrust loads to be carried by the thrust surfaces 19 and 27.

In accordance with the preferred embodiment of the present invention, at least a portion of the first and second thrust surfaces is coated with a layer of non-metallic, anti-friction material. The material may be coated on either one or both of the first and second thrust surfaces, and is preferably located on the driving member. It is also preferable that the thrust surfaces, and therefore the coating, be positioned opposite the shear surfaces of the driving and driven members. It will be seen that the material coating protects the contiguous surfaces of the driving and driven members whenever the thrust surfaces rub against one another.

The non-metallic, anti-friction material may comprise any material which may be applied to the indicated surfaces, will provide the indicated protection, and exhibits the required durability and performance characteristics for this application. Most preferably, the material comprises a polyarylene sulfide coating, which in particular may include polyphenylene sulfide, polynapthylene sulfide, polyanthracene sulfide and the lower-alkyl substituted derivatives thereof. The polyarylene sulfide which is preferred is polyphenylene sulfide. The polyarylene sulfide may be applied to the thrust surfaces in accordance with various known techniques, many of which are discussed or referenced in U.S. Pat. No. 3,964,582, issued to Mitchell on June 22, 1976, the pertinent portions of which are hereby incorporated by reference. The polyphenylene sulfide may be obtained under the trade name RYTON, a registered trademark for a brand of polyphenylene sulfide marketed by Phillips Petroleum Company. The sulfide may also include a filler such as glass beds, glass powder, or glass fibers. Other examples of fillers are polytetrafluoroethylene (Teflon) powder, molybdenum sulfide, titanium dioxide, and metallic particles such as iron, copper, etc.

The polyarylene sulfide may be applied as a powder or as a slurry, and may be sprayed upon the surfaces of the driving member, or it may be sintered, or it may be applied by fluidized bed coating. After such application, induction heating or any other standard heating method may be employed, typically at a temperature of at least 700° F., to cure the coating. Other specific methods for applying and curing the coatings are discussed in the cited patent to Mitchell.

The driven member 21, and preferably the cover 23, defines a shear fluid reservoir 32 which is most suitably located at the center of the cover. More particularly, the cover includes a central cavity 33 covered by a circular plate 34 received within a recess 35. A spring valve 36 is secured with a pin 37 to the plate 34. The plate defines a passageway 38 communicating between the reservoir 32 and working chamber 24. The spring valve 36 has a first position 39, below a given temperature, in which it blocks the passageway 38 and prevents the flow of shear fluid from the reservoir to the working chamber. Above a given temperature, the spring valve moves to the second position 40 in which its free end is spaced apart from the plate 34 and leaves the passageway 38 open to permit shear fluid flow from the reservoir to the working chamber. In conventional fashion, the spring valve may be operated by a bimetal spring 66 which above the predetermined temperature is in the position of FIG. 1, but which below such temperature moves the pin 67 axially to force the spring valve to the closed position 39.

The cover 23 is secured to the bearing housing 22 with bolts (not shown) received through aligned apertures in the outer perimeter of the cover and bearing housing. A perimetric seal 44 is received within an annular groove in the bearing housing and seals the driven member against fluid loss. Fins 45 and 46 preferably extend outwardly from the front and rear surfaces of the driven member to facilitate the dissipation of heat therefrom.

The driving member 11 includes several apertures extending from the first side to the second side of the driving member, and therefore permitting fluid flow from the first side to the second side. In particular, the driving member includes several first apertures 41 with which are associated grooves 42 extending through and connecting the annular grooves 17 of the driving member. The apertures 41 and associated grooves 42 operate to distribute shear fluid in the central part of the working chamber radially outward to the several annular grooves, and therefore into the fluid shear chamber defined by the opposed, shear surfaces of the driving and driven members. The driving member also includes several second apertures 43 which similarly extend through the driving member from the first side to the second side. The second apertures preferably are displaced a small distance radially-outward of the first apertures 41 to enhance the flow of shear fluid from the center portion of the working chamber 24 to the backside of the driving member. In this manner, fluid control means are provided for maintaining shear fluid between the first and second thrust surfaces to enhance the axial thrust load carrying capabilities of these surfaces and to thereby protect the adjacent surfaces by providing a good supply of shear fluid for separating the respective thrust surfaces.

In the preferred embodiment, separate, first and second flow means are provided for distributing shear fluid from the working chamber back to the reservoir and the central portion of the working chamber, respectively. An annular groove 47 is defined by the cover of the driven member and is positioned adjacent to and extending outwardly of the outer perimeter of the disc-shaped portion 15 of the driving member. The annular groove 47 is located on one side of the driving member. The driven member further defines a cylindrical cavity 48 which is aligned with and radially outward of the driving member. The cylindrical cavity 48 is therefore adjacent to and communicates with the annular groove 47, and provides for the flow of shear fluid through the cavity from the thrust surfaces to the groove 47.

In connection with the first flow means, an axial passageway 49 opens into the annular groove and also communicates with a radial passageway 50 which in turn opens into the reservoir 32. Shear fluid will consequently be forced from the fluid shear chamber and thrust chamber into the cylindrical cavity and annular groove, and through the passageways 49 and 50 back to the reservoir. At least one of each of such radial and axial passageways is provided communicating between the annular groove and the reservoir.

Similarly, the second flow means includes axial passageways 51 opening into the annular groove 47. However, the passgeways 51 communicate with radial passageways 52 which in turn communicate with passageways 53 which open into the central portion of the working chamber 24. In this fashion, the shear fluid which is circulated through the annular groove and cylindrical cavity to the passageways 51-53 is returned to the working chamber in a recycle path to be again distributed into the fluid shear chamber and/or thrust chamber. The provision of such a recycle path in combination with the apertures 41 and 43 provides a means for recirculating shear fluid into either or both of these chambers.

As shown, the radial bearings are preferably located on the same side of the driving member as the first thrust surface, although the radial bearings may as well be located on the opposite side of the driving member. Also, it is preferable that the thrust surfaces extend opposite the ridges and grooves of the driving member, although alternate locations for the thrust surfaces may be employed. Particular first and second flow means have been described, but these may also be varied in accordance with structures and techniques known in the art. For example, the reservoir is preferably centrally located in the cover of the driven member, but with suitable modifications could be located either radially outward of the driving member or in the bearing housing of the driven member. It will be appreciated that the passageways of the second flow means could be located on the side of the driving member opposite the location of the passageways of the first flow means. However, the described embodiment is preferred since the passageways for the second flow means may be made to be almost identical with those of the first flow means, with the exception that the radial passageways terminate short of the reservoir and are then connected by the additional passageways 53 with the center portion of the working chamber.

In a particular aspect of the present invention, there is provided a fluid shear coupling apparatus comprising a driving member received within a working chamber defined by the driven member. As shown in the preferred embodiment, the front side of the disc-shaped portion 15 of the driving member includes a first shear surface which is configured and positioned complementary to a first shear surface defined by the driven member, to define a fluid shear chamber therebetween which is cooperable with shear fluid within the chamber to transmit torque between the driving and driven members. In this aspect, the previously described first and second flow means are also provided. The first flow means provides flow of shear fluid between the reservoir and the working chamber. The first flow means therefore would include, for example, the flow of shear fluid from the reservoir through passageway 38 to the working chamber 24, as well as the return flow through the annular groove 48 and cylindrical cavity 47 and the passageways 49 and 50 back to the reservoir. It will be appreciated that in this aspect of the present invention the first flow means may employ different structures and techniques as understood in the art, which would provide the desired flow of fluid from the reservoir to the working chamber and back to the reservoir.

In this aspect of the invention, the second flow means provides flow of shear fluid from a radially-outward location, such as the cylindrical cavity 48 or annular groove 47, of the working chamber directly to a radially-inward location of the working chamber, such as the central portion of the working chamber as communicated with through passageway 53. The second flow means therefore provides substantially continuous recirculation of shear fluid through the working chamber between these first and second locations.

It will be appreciated that in different embodiments of this aspect of the present invention, the recirculation of the shear fluid may desirably occur on either the front or rear side, or both, of the driving member. As shown in the preferred embodiment, the recirculation occurs through the cover which is located on the front side of the driving member, but the provision of the apertures 41 and 43 particularly provides for recirculation of the shear fluid to the front and rear sides of the driving member, respectively.

In certain applications, it may be desirable only to recirculate the fluid to the front side of the driving member, such as in the case of a fluid shear coupling apparatus which does not include either shear surfaces or thrust surfaces on the rear side of the driving member. In this regard, the means for mounting the driven member to the driving member may include either the radial bearings, as previously defined, or combined radial and thrust bearings such as ball bearings or tapered roller bearings. It may therefore be that in particular embodiments of the present invention, the provision of thrust surfaces on the rear side of the driving member will not be necessary or desirable, and the provision of shear surfaces on the rear side of the driving member may or may not be included.

It will also therefore be understood that the provision of the apertures 41 and 43 is desirable in the preferred embodiment of the present invention, but it is not required in the case that recirculation of the shear fluid by the second flow means is intended only for one side of the driving member. At the same time, it may be preferable to locate the recirculation passageways on one side of the driving member while recirculating the shear fluid to the other side of the driving member, as is provided in the preferred embodiment described. In this application, the provision of the second apertures 43 provides a passageway permitting the shear fluid to pass through the driving member to the opposite side. In a further respect, the present invention may provide separate recirculation means located on opposite sides of the driving member and otherwise structured similar to that shown in the preferred embodiment. This would permit the recirculation of fluid to both sides of the driving member directly, without the requirement that the fluid pass through the driving member by means of the apertures 41 and 43.

It will be noted that the recirculation flow means is separate from the first flow means and the working chamber, and provides for a recirculation directly from the radially-outward location to the radially-inward location. The first flow means does provide recirculation under certain circumstanes when the fluid is permitted to flow from the working chamber to the reservoir and back to the working chamber. However, as defined and described, the second flow means is separate from this first flow means which operates primarily to control the coupling of the driving and driven members in response to a monitored temperature or other parameter.

The present invention preferably includes a bleed hole 54 which communicates by suitable passageway means between the reservoir and the working chamber to permit shear fluid in the reservoir to pass through the bleed hole to the working chamber. Control means provides a first condition during which shear fluid moves through the first flow means from the reservoir to the working chamber to cause coupling of the driving member and driven member. Such control means may include, for example, the spring valve 36 in cooperation with the passageway 38, whereby the positioning of the spring valve in the second position 40 will permit shear fluid to pass through the passageway to the working chamber. Also, the control means provides a second condition in which the amount of shear fluid in the working chamber is limited and consequently produces reduced coupling between the driving and driven members. It will be appreciated that a certain amount of shear fluid will remain in the working chamber, and most typically in the area of the shear and/or thrust chambers, and this is desirable. However, the amount of shear fluid is sufficiently reduced to avoid significant coupling of the driving and driven members to provide the apparatus with an uncoupled condition.

The provision of the bleed hole connecting from the reservoir to the working chamber will permit a certain amount of shear fluid to be added to the working chamber during the uncoupled condition, with the spring valve, for example, being in the first position 39 blocking the passageway 38. The bleed hole is provided to permit a certain amount of recirculation of fluid from the reservoir and through the working chamber to maintain movement of the fluid within the working chamber, and particularly to assist in heat dissipation during the uncoupled condition. As a particular feature of the present invention, the bleed hole cooperates with the second flow means to provide adequate shear fluid for recycling through the shear and/or thrust chambers as previously described. It will be understood that the flow rates of shear fluid to and from the reservoir will assume a steady state condition under which the amount of shear fluid returning to the reservoir is equal to that entering the working chamber through the bleed hole, and this amount of shear fluid in the working chamber will therefore be available for recycling by the second flow means. In accordance with certain embodiments of the present invention, the fluid entering the working chamber by means of the bleed hole may desirably be directed to the opposite side of the driving member, or may be directed to the opposite side of the driving member by the second flow means.

As shown in the preferred embodiment of the present invention, the passageway 38 and bleed hole 54 direct the shear fluid from the reservoir to the working chamber at a location radially-inward of the shear and/or thrust surfaces of the driving and driven members. Similarly, in the preferred embodiment the shear fluid returned to the reservoir from the working chamber is returned from a location radially-outward of the shear and/or thrust surfaces. It will be appreciated that particularly with respect to the recycle of shear fluid provided by the second flow means the fluid need not be directed into the working chamber radially-inward of all portions of the shear and/or thrust surfaces, and need not be removed from the working chamber at a location which is radially-outward of all portions of the shear and/or thrust surfaces. It is sufficient that the second flow means recirculate the shear fluid from a radially-outward location to a radially-inward location, and at least a portion of the shear and/or thrust surfaces intended to be accommodated by such recirculation lie between these locations. It is most preferable, however, that the shear fluid be introduced into the working chamber radially-inward of these surfaces, and that it be removed radially-outward of such surfaces.

In connection with this aspect of the present invention, a fluid shear coupling apparatus is provided which includes a first flow means for providing a flow of shear fluid between a shear fluid reservoir and the working chamber. Second flow means are also provided for recirculating shear fluid from a radially-outward location to a radially-inward location. The recirculation of fluid by the second flow means affords the advantage of increased heat dissipation, particularly during the uncoupled condition for the apparatus, and therefore contributes to long life for the apparatus. As will be further detailed in the following description, the recirculation provided by the second flow means is also particularly well suited for cooperation with other aspects of the present invention, particularly in the case of the presence of thrust surfaces on the rear side of the driving member. In addition, the presence of the fluid recirculation slightly reduces the positive engagement of the apparatus to a partial modulation. In other words, the changes resulting in transfer between the coupled and uncoupled conditions of the apparatus will be slightly minimized since typically a greater amount of shear fluid remains in the working chamber as a result of this recirculation than would otherwise occur.

In the second aspect of the present invention, there is again provided a driving member including a disc-shaped portion having a front side and a rear side, with the front side including a first shear surface. There is also provided a driven member defining a working chamber within which the driving member is received, and including a first shear surface configured and positioned complementary to the first shear surface of the driving member to define the fluid shear chamber therebetween. As in the case of the first aspect of the present invention, it will be appreciated that the particular shape and positioning of the shear surfaces may be varied without departing from this aspect of the present invention. Similarly, means are provided for mounting the driven member to the driving member to be rotatable about a common axis, and such means may in this aspect encompass radial bearings, ball bearings, tapered roller bearings and the like. The coupling apparatus in this aspect also includes a shear fluid reservoir, first flow means for providing flow of shear fluid from the reservoir to the working chamber on both sides of the driving member, and second flow means for providing flow of shear fluid from the working chamber on both sides of the driving member back to the reservoir.

The first flow means of the present invention provides flow of shear fluid to both sides of the driving member at a first location which is radially-inward of at least a portion of the first shear surface, it being preferred that the first location be radially-inward of all of the first shear surface. As well, the rear side of the driving member may define a shear surface or a thrust surface positioned complementary with corresponding shear or thrust surfaces of the driven member. In such embodiments, it is desirable that the first flow means provide shear fluid to the rear side of the driving member and radially-inward of at least a portion of said shear or thrust surfaces, and most preferably to be radially-inward of all of such surfaces. It will be noted that the shear fluid is provided to both sides of the driving member without having passed through the working chamber radially-outward of this first location. This is to be distinguished, for example, from prior art devices in which the shear fluid simply passes into the working chamber on one side of the driving member and after passing radially-outward of the driving member will begin to fill up the space on the rear side of the driving member.

The flow of shear fluid to both sides of the driving member is particularly well adapted for combination with the recirculation flow means as described in connection with the second aspect of the present invention. As indicated in that discussion, the recirculation flow means may direct the shear fluid from a radially-outward location of the working chamber back to a radially-inward location in the working chamber. The shear fluid in certain embodiments is desirably directed to both sides of the driving member in connection with such recirculation. This may be readily accomplished in accordance with the construction of the driving member as follows.

In the preferred embodiment, the first flow means for directing the shear fluid to both sides of the driving member includes at least one, and preferably several, passageways defined by and extending through the driving member from the front side to the rear side, and most typically at a location radially-inward of the shear and/or thrust surfaces. Shear fluid entering the working chamber at or radially-inward of the passageways extending through the driving member will thereby be enabled to pass through the driving member to be distributed to both sides of the driving member. As described with respect to the preferred embodiment, the shear fluid directed to the working chamber either from the reservoir through passageway 38 or bleed hole 54, or by the recirculation flow entering the working chamber from passageway 53, will enter the working chamber at or radially-inward of such passageways through the driving member.

In the preferred embodiment, three such passageways or apertures 41 are positioned at a first radial location, and communicate with radial grooves 42 extending along the front side of the driving member. The grooves 42 are particularly useful in conjunction with the several ridges and grooves of the driving member defining the shear surfaces since the flow of shear fluid into each of these grooves is greatly facilitated. However, the grooves will also be useful for planar shear surfaces, as well as for planar or otherwise configured thrust or shear surfaces on the rear side of the driving member.

Also in the preferred embodiment, three additional passageways or apertures 43 are located at a second radial location to extend slightly outward of the apertures 41. These second apertures or passageways 43 do not communicate with the radial grooves, and therefore will distribute substantial portions of shear fluid entering into these passageways to the opposite or rear side of the driving member. By placing the second apertures at a location extending a slight distance radially-outward of the first aperture, the distribution of shear fluid to the opposite side of the driving member is enhanced, and a situation in which all of the shear fluid passes directly to the front side of the driving member is avoided.

In accordance with the present invention, a fluid shear coupling apparatus is provided which includes a first flow means for providing a flow of shear fluid from the shear fluid reservoir to both sides of the driving member, and a second flow mens for providing flow of shear fluid from both sides of the driving member back to the reservoir. In this manner, an expedient method for distributing the shear fluid to both sides of the driving member is obtained. This is especially advantageous in the circumstances in which shear and/or thrust surfaces are located on both sides of the driving member. In the preferred embodiment, this provision of fluid to both sides of the driving member is accomplished by very simple structure, primarily the provision of the passageways extending through the driving member. The resulting advantages are also particularly well adapted for use in conjunction with the recirculation fluid described in conjunction with the second aspect of the present invention.

The pumping action which drives the shear fluid through the passageways leading from the cylindrical cavity 48 and groove 47 may in general be achieved in accordance with structures known in the art. The outward force exerted on the shear fluid by the rotation of the driving member will typically create a pressure head which will force the fluid into and through the passageways leading from the annular groove 47. In a third aspect of the present invention, a particular structure is provided to enhance this pumping action, while also achieving the advantage of providing additional shear surfaces for torque transmission.

In connection with this third aspect, the driving member includes a disc-shaped portion having a front side defining a shear surface and positioned complementary to a shear surface defined by the driven member. The driving member is received within a working chamber defined by the driven member, and the associated shear surfaces define a fluid shear chamber cooperable with shear fluid to transmit torque between the driving member and the driven member. Mounting means employing radial bearings, ball bearings, tapered roller bearings and the like provide for rotation of the driving and driven members about a common axis.

In this aspect of the present invention, a particular flow means is provided for flowing shear fluid from the working chamber to the reservoir. This flow means includes an annular groove 47 defined by the driven member adjacent and extending outwardly of the outer perimeter 55 of the disc-shaped portion 15 of the driving member. This flow means also includes a cylindrical cavity 48 aligned with and radially outward of the driving member, which cylindrical cavity is adjacent to and communicates with the annular groove. A passageway 49 opens into the annular groove and extends to and communicates with the reservoir 33 by means of a second passageway 50.

Figure 5:
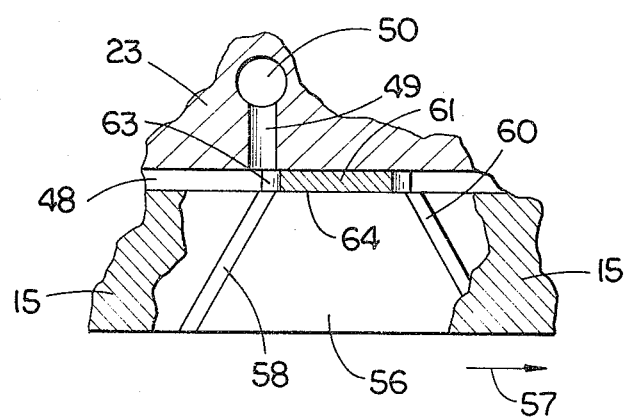
FIG. 5 is a partial, cross-sectional view of the apparatus of FIG. 1, taken along the line 5—5 in FIG. 4 and looking in the direction of the arrows.

The third aspect of the present invention provides a projection 56 within the cylindrical cavity. For the purposes of description, the driving member 11 is considered to rotate in a first direction 57, and the projection 56 includes a front end surface 58 facing the rotation of the driving member. The front end surface 58 is located adjacent the opening of the passageway 49. More preferably, the passageway 49 is located in the first direction 57 from the front end surface of the projection. It is also preferable that the front end surface be angled toward the passageway 49, as shown particularly in FIG. 5, to direct shear fluid impinging upon the front end surface toward the passageway. The projection 56 is preferably a boss formed integral with the driven member, but alternatively may be an insert which is secured within the cavity by suitable means, such as a pin.

Figure 4:
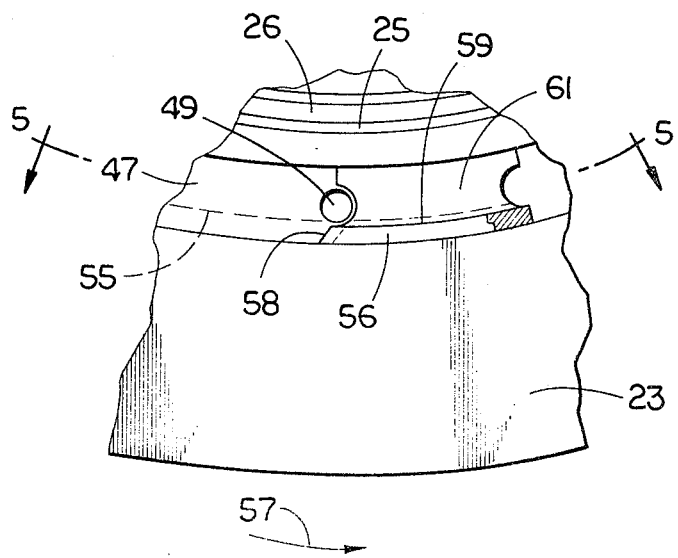
FIG. 4 is a partial, cross-sectional view of the cover, and particularly showing the location of a projection and dam with respect to the annular groove.
Figure 3:
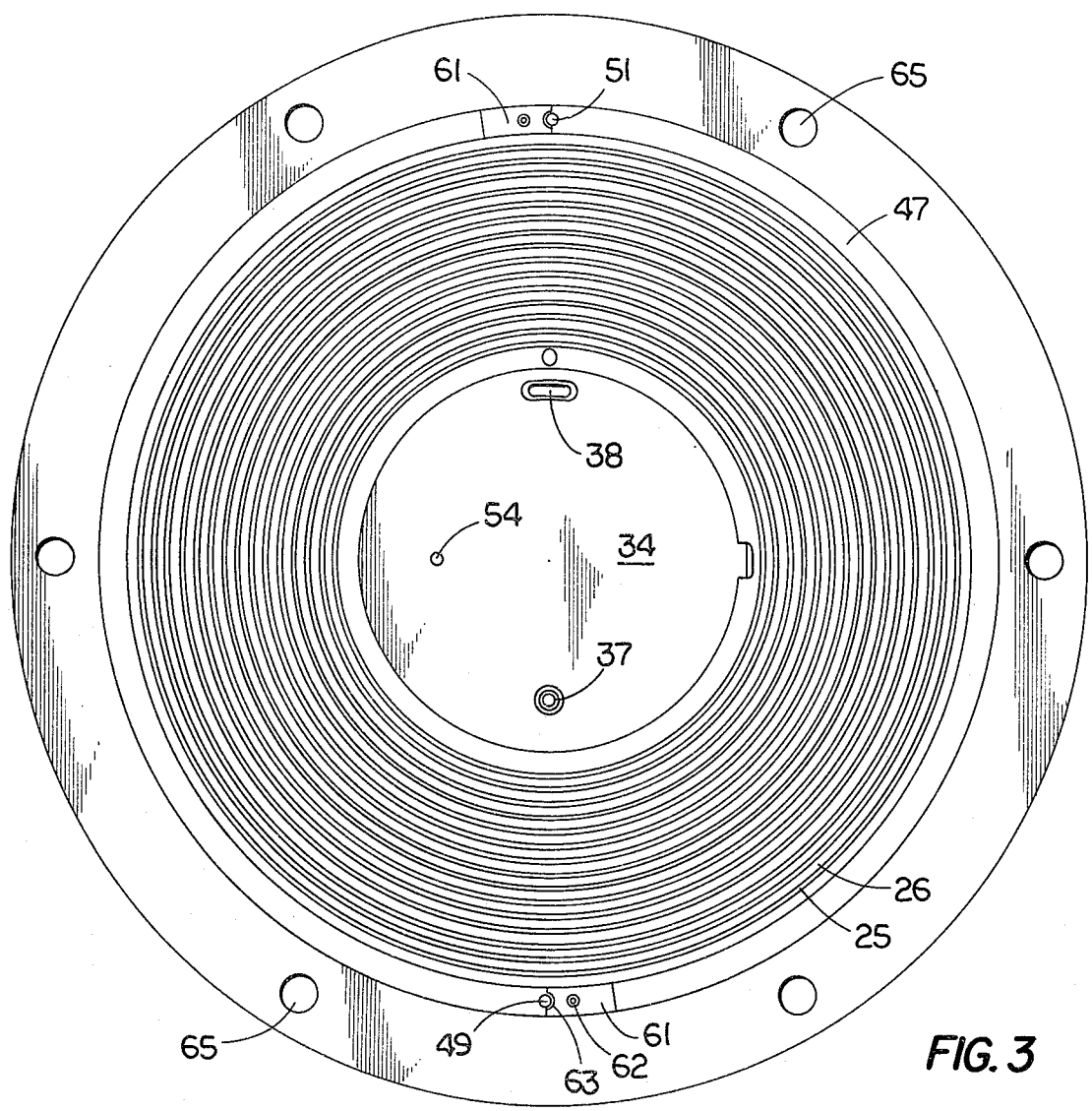
FIG. 3 is a rear, elevational view of the cover of the fluid shear coupling apparatus of FIG. 1.

The projection 56 also includes a radially-inward arcuate surface 59 which defines a shear surface. The arcuate surface 59 is located to be adjacent the outer perimeter 55 (FIG. 4) of the disc-shaped portion 15, and thereby defines a fluid shear chamber therebetween for the transmission of torque between the driving member and the driven member. The arcuate surfaces of the one or more projections extend for at least about 30% of the cylindrical cavity, and preferably not more than about 70% of the cavity. The front end surface 58 is suitably tapered to the bottom of the cylindrical cavity, as is shown particularly in FIG. 4, to facilitate the flow of shear fluid adjacent the projection and the perimeter of the driving member, and it is also preferable that the rear end surface 60 be similarly tapered.

The fluid shear coupling apparatus in this aspect also includes a dam 61 received within the annular groove 47, and preferably comprising a separate element secured within the groove by suitable means, such as a pin 62. The dam 61 includes a front end surface 63 facing the rotation of the driving member and positioned in the first direction from the opening of the passageway 49. The dam therefore operates in customary fashion to cause a pressure increase in the shear fluid adjacent the passageway 49, and therefore to cause the shear fluid to pass into and through the passageway. It will be seen that the angled front end surface 58 of the projection, and more generally the presence of the associated projection 56, will enhance the pumping action by causing a further blockage of flow of shear fluid around the cylindrical cavity. In addition, the side surface 64 of the dam is configured and positioned to define a shear surface which cooperates with a corresponding shear surface of the driving member to provide a shear chamber for the transmission of torque between the driving member and the driven member.

What is claimed is:

1. A fluid shear coupling apparatus which comprises:
   a driving member including a disc-shaped portion having a front side and a rear side, the front side including a first shear surface;
   a driven member defining a working chamber within which said driving member is received, said driven member including a first shear surface configured and positioned complementary to the first shear surface of said driving member to define a fluid shear chamber therebetween and cooperable with shear fluid in the fluid shear chamber to transmit torque between said driving member and said driven member;
   mounting means for mounting said driven member to said driving member and rotatable about a common axis;
   a shear fluid reservoir;
   first flow means for providing flow of shear fluid from said reservoir to the working chamber and from the working chamber to said reservoir; and
   second flow means, separate from the working chamber and said reservoir, for providing flow of shear fluid from a radially-outward location of the working chamber directly to a radially-inward location of the working chamber for permitting substantially continuous recirculation of shear fluid through the working chamber between the first and second locations, said second flow means including a passageway defined by said driven member and extending radially inward only to about the radially-innermost portion of the first shear surface, the passageway communicating with the fluid shear chamber and directing the recirculated shear fluid back into the fluid shear chamber at a location only as radially inward as about the radially-innermost portion of the first shear surface.

2. The apparatus of claim 1 in which said second flow means is for providing flow of shear fluid from a location of the working chamber on the front side of said driving member radially-outward of a portion of the first shear surface of said driving member to a location of the working chamber on the front side of said driving member radially-inward of a portion of the first shear surface of said driving member.

3. The apparatus of claim 2 in which the rear side of said driving member includes a second shear surface and said driven member includes a second shear surface configured and positioned complementary to the second shear surface on the rear side of said driving member to define a second fluid shear chamber therebetween and cooperable with shear fluid in the second fluid shear chamber to transmit torque between said driving member and said driven member, said second flow means further being for providing flow of shear fluid from a location of the working chamber on the rear side of said driving member radially-outward of a portion of the second shear surface of said driving member to a location of the working chamber on the rear side of said driving member radially-inward of a portion of the second shear surface of said driving member.

4. The apparatus of claim 1 in which the rear side of said driving member includes a thrust surface and said driven member includes a thrust surface configured and positioned complementary to the thrust surface of said driving member to transmit axial thrust loads between said driving member and said driven member, said second flow means further being for providing flow of shear fluid from a location of the working chamber on the rear side of said driving member radially-outward of a portion of the thrust surface of said driving member to a location of the working chamber on the rear side of said driving member radially-inward of a portion of the thrust surface of said driving member.

5. The apparatus of claim 4 in which said second flow means further is for providing flow of shear fluid from a location of the working chamber on the front side of said driving member radially-outward of a portion of the first shear surface of said driving member to a location of the working chamber on the front side of said driving member radially-inward of a portion of the first shear surface of said driving member.

6. The apparatus of claim 1 and which includes control means for providing a first condition during which shear fluid moves through said first flow means from said reservoir to the working chamber to cause coupling of said driving member and driven member and for providing a second condition limiting shear fluid in the working chamber to cause reduced coupling, said shear fluid reservoir defining a bleed hole, said apparatus further including passageway means connecting the bleed hole with the working chamber for permitting shear fluid in said reservoir to pass through said blend hole to the working chamber at least during the second condition of said control means.

7. The apparatus of claim 6 in which said shear fluid reservoir is located radially-inward of the first shear surface of said driving member and said first flow means is for providing flow of shear fluid to said shear fluid reservoir from a location radially-outward of the first shear surface of said driving member.

8. The apparatus of claim 7 in which said first flow means is for providing flow of shear fluid from said shear fluid reservoir to the working chamber radially-inward of the first shear surface of said driving member, and in which said passageway means includes a passageway connecting the bleed hole with the working chamber radially-inward of the first shear surface of said driving member.

9. The apparatus of claim 6 in which said second flow means is for providing flow of shear fluid from a location of the working chamber on the front side of said driving member radially-outward of a portion of the first shear surface of said driving member to a location of the working chamber on the front side of said driving member radially-inward of a portion of the first shear surface of said driving member.

10. The apparatus of claim 9 in which the rear side of said driving member includes a second shear surface and said driven member includes a second shear surface configured and positioned complementary to the second shear surface on the rear side of said driving member to define a second fluid shear chamber therebetween and cooperable with shear fluid in th second fluid shear chamber to transmit torque between said driving member and said driven member, said second flow means further being for providing flow of shear fluid from a location of the working chamber on the rear side of said driving member radially-outward of a portion of the second shear surface of said driving member to a location of the working chamber on the rear side of said driving member radially-inward of a portion of the second shear surface of said driving member.

11. The apparatus of claim 6 in which the rear side of said driving member includes a thrust surface and said driven member includes a thrust surface configured and positioned complementary to the thrust surface of said driving member defining a thrust chamber therebetween and cooperable with shear fluid in the thrust chamber to transmit axial thrust loads between said driving member and said driven member, said second flow means further being for providing flow of shear fluid from a location of the working chamber on the rear side of said driving member radially-outward of a portion of the thrust surface of said driving member to a location of the working chamber on the rear side of said driving member radially-inward of a portion of the thrust surface of said driving member.

12. The apparatus of claim 11 in which said second flow means further is for providing flow of shear fluid from a location of the working chamber on the front side of said driving member radially-outward of a portion of the first shear surface of said driving member to a location of the working chamber on the front side of said driving member radially-inward of a portion of the first shear surface of said driving member.

13. The apparatus of claim 1 in which said second flow means includes at least one passageway defined by and extending through said driving member from the front side to the rear side.

14. The apparatus of claim 13 in which said second flow means includes a recycle passageway connecting a location of the working chamber radially-outward of the passageway defined by and extending through said driving member to a location of the working chamber at least as radially-inward as the passageway in said driving member, whereby some of the shear fluid moving through the recycle passageway will pass through the passageway in said driving member to the other side of said driving member.

15. The apparatus of claim 14 in which the aperture in said driving member is located radially-inward of the first shear surface of said driving member.

16. The apparatus of claim 15 in which the location of the working chamber radially-outward of the aperture is radially-outward of the first shear surface of said driving member.

17. The apparatus of claim 16 in which said second flow means is for providing flow of shear fluid from a location of the working chamber on the front side of said driving member radially-outward of a portion of the first shear surface of said driving member to a location of the working chamber on the front side of said driving member radially-inward of a portion of the first shear surface of said driving member, the rear side of said driving member including a second shear surface and said driven member including a second shear surface configured and positioned complementary to the second shear surface of the rear side of said driving member to define a second fluid shear chamber therebetween and cooperable with shear fluid in the second fluid shear chamber to transmit torque between said driving member and said driven member, said second flow means further being for providing flow of shear fluid from a location of the working chamber on the rear side of said driving member radially-outward of a portion of the second shear surface of said driving member to a location of the working chamber on the rear side of said driving member radially-inward of a portion of the second shear surface of said driving member.

18. The apparatus of claim 16 in which said second flow means further is for providing flow of shear fluid from a location of the working chamber on the front side of said driving member radially-outward of a portion of the first shear surface of said driving member to a location of the working chamber on the front side of said driving member radially-inward of a portion of the first shear surface of said driving member, the rear side of said driving member including a thrust surface and said driven member including a thrust surface configured and positioned complementary to the thrust surface of said driving member defining a thrust chamber therebetween and cooperable with shear fluid in the thrust chamber to transmit axial thrust loads between said driving member and said driven member, said second flow means further being for providing flow of shear fluid from a location of the working chamber on the rear side of said driving member radially-outward of a portion of the thrust surface of said driving member to a location of the working chamber on the rear side of said driving member radially-inward of a portion of the thrust surface of said driving member.

* * * * *